United States Patent
Drazic et al.

(10) Patent No.: US 10,091,483 B2
(45) Date of Patent: Oct. 2, 2018

(54) METHOD AND DEVICE FOR TEMPORAL FILTERING OF DISPARITY MAPS

(71) Applicant: THOMSON LICENSING, Issy de Moulineaux (FR)

(72) Inventors: Valter Drazic, Betton (FR); Guillaume Boisson, Pleumeleuc (FR); Paul Kerbiriou, Thorigne-Fouillard (FR)

(73) Assignee: Thomson Licensing, Issy-les-Moulineaux (FR)

( * ) Notice: Subject to any disclaimer, the term of this patent is extended or adjusted under 35 U.S.C. 154(b) by 1202 days.

(21) Appl. No.: 13/924,751

(22) Filed: Jun. 24, 2013

(65) Prior Publication Data
US 2013/0342642 A1   Dec. 26, 2013

(30) Foreign Application Priority Data

Jun. 25, 2012  (EP) .................................. 12305735
Dec. 12, 2012  (EP) .................................. 12306572

(51) Int. Cl.
*H04N 15/00*  (2006.01)
*H04N 13/00*  (2018.01)
*H04N 13/128*  (2018.01)
*H04N 13/122*  (2018.01)

(52) U.S. Cl.
CPC ......... *H04N 13/128* (2018.05); *H04N 13/122* (2018.05)

(58) Field of Classification Search
CPC .................................. H04N 13/0022
See application file for complete search history.

(56) References Cited

U.S. PATENT DOCUMENTS

| | | | |
|---|---|---|---|
| 5,512,956 A * | 4/1996 | Yan ........................ | H04N 19/86 348/606 |
| 7,570,309 B2 | 8/2009 | Zhou et al. | |
| 8,717,390 B2 * | 5/2014 | Gross .................... | G06T 3/0012 345/648 |
| 2005/0280739 A1 * | 12/2005 | Lin ........................ | H04N 5/144 348/607 |
| 2006/0139494 A1 * | 6/2006 | Zhou ...................... | H04N 5/144 348/607 |
| 2007/0236567 A1 * | 10/2007 | Pillman .............. | H04N 5/23212 348/143 |
| 2007/0237514 A1 * | 10/2007 | Pillman .................... | G03B 7/00 396/153 |
| 2011/0254921 A1 * | 10/2011 | Pahalawatta ....... | H04N 13/0029 348/43 |

FOREIGN PATENT DOCUMENTS

| | | |
|---|---|---|
| JP | 4689667 | 5/2011 |
| KR | 1020060076176 | 7/2006 |
| WO | WO2011046607 | 4/2011 |

* cited by examiner

*Primary Examiner* — Jeremaiah C Hallenbeck-Huber
*Assistant Examiner* — Amir Shahnami
(74) *Attorney, Agent, or Firm* — Tutunjian & Bitetto, P.C.

(57) ABSTRACT

The invention consists in a method of and a device for temporal filtering of disparity maps of n different frames, each map indicating the disparity of pixels of 3D images comprising the steps of marking the stationary pixels and the non stationary pixels and implementing temporal filter for stationary pixels, detecting limitations for temporal filtering corresponding to a variation of moving pixels above a determined threshold value and automatically de-activating the temporal filters as response to the detected limitations for temporal filtering.

5 Claims, 2 Drawing Sheets

METHOD AND DEVICE FOR TEMPORAL FILTERING OF DISPARITY MAPS

This application claims the benefit, under 35 U.S.C. § 119 of European Patent Application 12305735.8, filed Jun. 25, 2012 and European Patent Application 12306572.4, filed Dec. 12, 2012.

1. FIELD OF THE INVENTION

The invention concerns temporal filtering of disparity maps of 3D images and more precisely the deactivating or reactivating of temporal filtering. It concerns 3D rendering.

2. PRIOR ART

Disparity calculation is an essential tool in computer vision or in the 3D industry. It is used in numerous applications such as robot navigation through depth ranging, gesture recognition, view interpolation for creating multi-view content from a stereo image pair, 2D to 3D conversion.

Disparity is typically calculated from two views with a different parallax, like the left and right camera from a stereo rig. It consists in a correspondence search for identical features in both images and measures their relative position difference in both images.

Hence a problem that arises out of processing stereo sequences is the temporal variation of disparity measurements. Filtering technique, referred as "temporal filter" is capable of reducing the temporal variations of disparity measurements. This technique improves the disparity matching.

One of the difficulties of the disparity matching is further the temporal inter frame stability. A disparity match in low textured areas of an image pair can differ from one frame to the other, in particular in areas where there are neither movements, nor illumination variation. The bad result here from is that those areas exhibit temporal flickering because of this almost random variation of the disparity.

Document "temporal filtering of disparity measurements" by L. Di Stefano et al. discloses a temporal filtering technique which improves temporal consistency of disparity measurements by reducing the matching errors due to the noise affecting the imaging system. Transition "static=>dynamic" implies that the order of the filter must drop to zero as soon as motion is detected in order to get rid of the past history of the point under examination.

For moving objects the filter is then by-passed (i.e. the order of the filter is set to 0) so as to promptly follow the structural disparity variations in the scene. Conversely, for static points the order of the filter is kept as high as possible, through a smooth incremental variation, in order to provide the maximum capability to filter away uncertain disparity measurements. But abrupt changes which are different from static to dynamic or dynamic to static change relate to uncontrolled change in the image and are source of disturbing and interframe instability.

Figure 1:

In the FIG. 1, the bottom pictures represent the images from the left camera at two different time frames. (Right images are not shown). On the top, the disparity maps which are calculated between the left and right images at the two different timeframes are shown as heat maps. On some non moving areas that should have the same disparity value, and hence the same color, some differences appear. At least three of them are shown on the maps (that are emphasized with the use of circles). These differences are normal in a matching because in low textured areas, the matching is not very precise.

Then, a temporal lowpass filter is effectively implemented for stationary pixels in a real-time matching software, taking advantage from the time aspect, in order to make the matching more robust and non fluctuating over time.

But there is some use case limitation of that temporal filtering. The problem to be solved by the invention is how to improve the temporal filtering in some use case limitation.

3. SUMMARY OF THE INVENTION

One particular embodiment of the invention consists in a method of temporal filtering of disparity maps of n different frames, each map indicating the disparity of pixels of 3D images comprising the steps of marking the stationary pixels and the non stationary or moving pixels and implementing temporal filter for stationary pixels. The method further comprises the step of

- detecting limitations for temporal filtering corresponding to a variation of moving pixels above a determined threshold value;
- automatically de-activating the temporal filters as response to the detected limitations for temporal filtering.

The invention will permit to implement the temporal filtering of the disparity map in a general application not limited to the use case.

According to an aspect of an embodiment of the present invention the method further comprising the step of automatically reactivating the temporal filters if there is no more limitations for temporal filtering.

In an advantageous embodiment of the invention, detecting limitations for temporal filtering consists in detecting if the percentage of pixels of the disparity maps that have moved within n successive frames is above a determined threshold value.

In an advantageous embodiment of the invention, the step of detecting limitations for temporal filtering consists in detecting a scene cut or in detecting accidental cameras moving or in detecting abnormal displacement of an object.

In an advantageous embodiment of the invention, the temporal filtering is implemented with a temporal lowpass filter for stationary pixels.

In an advantageous embodiment of the invention, the temporal filtering is implemented with a trilateral filter for non-stationary pixels.

In an advantageous embodiment of the invention, the filter de-activates automatically if the percentages of pixels that have that have moved within n successive frames is above 15 to 25%.

The invention also relates to a device for temporal filtering of disparity maps of n different frames, each map indicating the disparity of pixels of 3D images comprising the steps of marking the stationary pixels and the non stationary pixels and implementing temporal filter for stationary pixels. Such device comprises means for detecting limitations for temporal filtering corresponding to a variation of moving pixels above a determined threshold value and means for automatically de-activating the temporal filters as response to the detected limitations for temporal filtering.

In an advantageous embodiment of the invention, the device comprises further means for automatically reactivating the temporal filters if there is no more limitations for temporal filtering.

In an advantageous embodiment of the invention, the means for detecting limitations for temporal filtering detects if the percentage of pixels of the disparity maps that have moved within n successive frames is above a determined threshold value.

In an advantageous embodiment of the invention, the means for detecting limitations for temporal filtering detects a scene cut, accidental cameras moving or abnormal displacement of an object.

In an advantageous embodiment of the invention, the temporal filters de-activate automatically if the percentage of pixels that have moved within n successive frames is above 15 to 25%.

4. LIST OF FIGURES

The above and other aspects of the invention will become more apparent by the following detailed description of exemplary embodiments thereof with reference to the attached drawings in which:

FIG. 1 discloses two disparity maps at different times that have differences on some areas, while these areas were stationaries (i.e no movement occurs in such areas).

Figure 2:
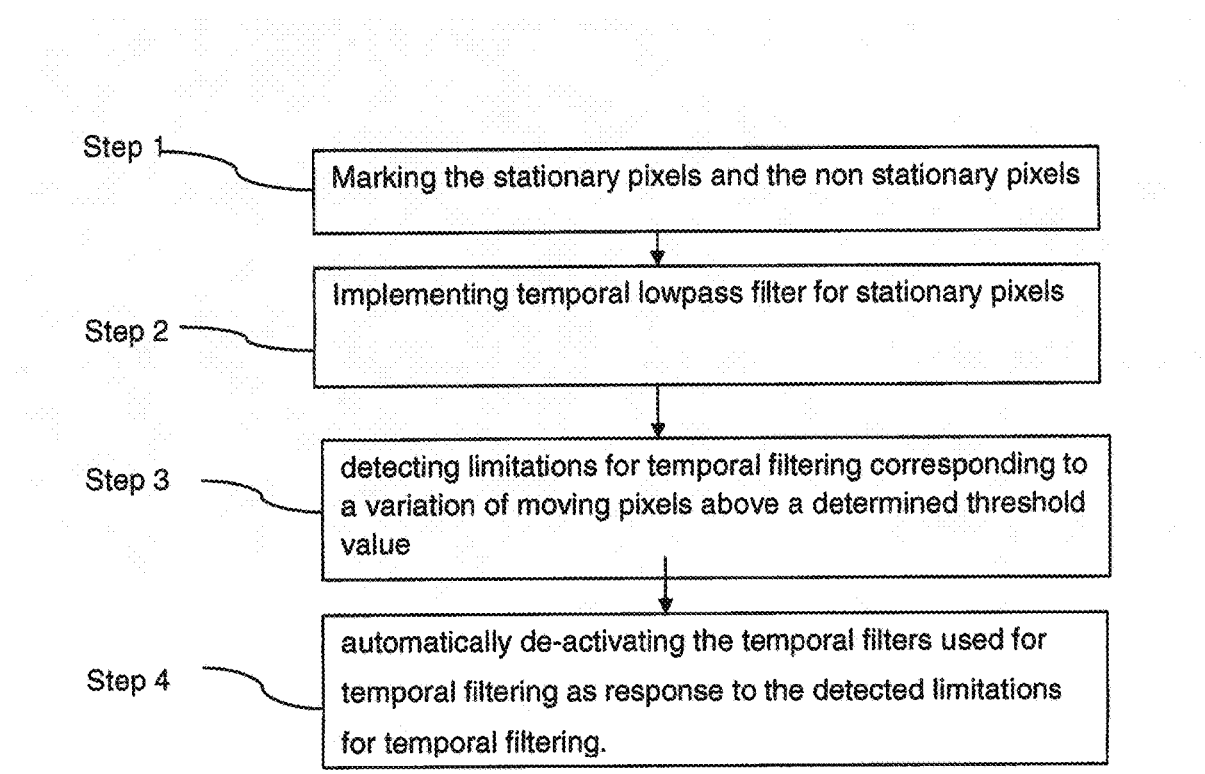

FIG. 2 is a work flow in accordance with an exemplary embodiment of the present invention.

5. DETAILED DESCRIPTION OF THE INVENTION

Hereinafter, the present invention will be described more fully:

First, "temporal filtering" is a technique employed to decrease the temporal variation of the zones which were badly matched.

On certain parts of the disparity map corresponding to stationary pixels there is an operation of local low-pass temporal filtering. Moreover, on other parts of moving pixels temporal filtering includes also a trilateral space filtering of moving pixels.

The first step for implementing the temporal lowpass filter is the detection of stationary areas. For that purpose actual frame and the immediate neighboring ones restricted to an odd number are used, for instance, t−2, t−1, t0, t+1, t+2 or 5 frames. For every pixel of the input RGB (Red, Green, Blue) left image, the RGB absolute mean differences D between two successive frames is calculated as following:

$$D = \Sigma_{C=\{R,G,B\}} |I_c(x,y,t) - I_c(x,y,t-1)|$$

If the sum D of absolute difference of the intensity of light $I_c$ at each pixel for each color between two successive frames t and t−1 is greater than a threshold, the pixel is labeled as not stationary or moving. This is done for all 4 intervals between t−2 and t+2 and the labels are accumulated. Those pixels will undergo a spatial bilateral or trilateral filtering.

Finally, only the pixels that have never received a not stationary label during the four successive evaluations will be considered stationary, and only those pixels will undergo a temporal low pas filtering.

In a second step, the L-R matching of n frames will be realized. This L-R matching produces typically n (odd number) disparity maps for the left view and as many for the right view.

As already all the pixels that have not undergone a change over the odd n frames have been detected, those stationary pixels can be temporally low pass filtered in the disparity map for the time $t_0$ by (for instance) averaging the disparity at that location with the disparities calculated at frames t−2 through t+2.

The disparity at pixel locations that have been marked as "moving" in one of the n frames can be kept as they have been calculated at $t_0$. But it is not very satisfactory to keep them, since those zones are very visible in the disparity maps in contrast to those that have been temporally low pass filtered. Therefore, those zones will undergo a trilateral filtering with a mask. The mask consists in accumulating the positions of all the pixels that have been moved in one of the n frames.

The trilateral filter with masking will use the disparity map at $t_0$, the RGB image at $t_0$ and will hence smooth the disparity over the entire region where something has moved. The general trilateral filter is used to filter the noise in the non stationary area detection.

It will be preceded incrementally, by adding the next L-R frames and doing again stationary pixel detection and temporal low pass filtering on the last n frames.

This known processing represented by the first and second step of FIG. 2 is very effective in stabilizing the disparity values in temporally flickering zones. But this processing has some limitations.

Limitations are per example:

If there is a scene cut, this will cause the algorithm to believe that between the frame before the cut, and after the cut, all pixels have moved, which is not bad but moving pixels will continue to be searched over n frames which is a time consuming task on one hand, and on the other hand, the trilateral filtering will try to even out the differences between totally different images which ends up with a big mess. The result is that (n−1)/2 frames before and after the cut will get totally false disparities for all pixels.

If the acquisition system, which consists in two cameras, is panning, zooming, or if the cameras are moving, a major part of the pixels will be detected as non stationary and again, the trilateral filter will try to build some coherence between parts of scenes where there is none.

If everything is fixed (no zooming, panning or camera displacements), but if a big object in the scene undergoes a big displacement from one frame to the other, we will end up with the same problem as described in the previous item.

Therefore, these temporal filters have to be restricted to use cases that exclude at least the previous three items corresponding to important variation of moving pixels.

The invention consists in a way of implementing these temporal filters (the lowpass filter or the trilateral filter) which takes advantages of its important, useful and very effective ability to make the disparity constant and robust temporally, without its disadvantages.

FIG. 2 is a work flow in accordance with an exemplary embodiment of a method of the present invention. The method of temporal filtering of disparity maps of n different frames consists in a first step in marking the stationary pixels and the non stationary pixels. Not-stationary pixels are further called moving pixels. The method consists then in a following step in implementing temporal filter for stationary pixels.

Furthermore, as represented by the steps 3 and 4 of FIG. 2, the invention detects the limitation situations described above, and as soon as they have been detected, the temporal filtering will be de-activated.

And if again the use-case is met where the temporal filters are activated, the temporal lowpass filtering will be re-activated as the trilateral spatial filtering.

There is a way of detecting the limitation cases to the filtering. As we have marked all stationary pixels over n frames, we can calculate the percentage of pixels that have moved within the n frames. If that percentage is above a threshold, one of the cases, or all possible combinations of them, is arising, and the temporal filtering de-activates automatically. In the case of stationary pixels, only the temporal low pass filter was activated and will then de-activates automatically. As soon as the percentage of moving pixels over n frames is again below the threshold, the temporal filters reactivate.

This has proven to be a very efficient implementation of temporal low pass filtering. It is functional in the matching algorithm Matchbox. We do not need to take care of the special cases and situation, as it detects automatically when it can activate the low pass filtering, and when it has to be de-activated or re activated.

And it detects automatically when it can activate the trilateral filtering, and when it has to be de-activated or re activated.

Some practical values: 3, 5 or 7 frames can be used to temporally low pass filtering. Five frames is a typical number in which a pixel is marked as stationary between two consecutive frames if the RGB absolute mean difference D between two successive frames is below 10 (R, G, and B coded from 0 to 255). The temporal lowpass filter de-activates automatically if the percentage of pixels that have changed over n accumulated frames is above 15 to 25%.

The invention claimed is:

1. A method of temporal filtering of n different successive disparity maps obtained from n different successive frames, n being an integer greater or equal to 2, each frame having a left image and a right image, each disparity map being associated with a frame, and indicating the disparity of pixels of images of said frame, said method comprising:
   for a current disparity map, marking the stationary pixels and the non-stationary pixels according to a comparison of pixel disparity values and a first threshold, and implementing temporal filter for stationary pixels; and
   de-activating the temporal filters for at least said current disparity map when a variation of the number of non-stationary pixels from said current disparity map and at least one previous disparity map from said n different successive disparity maps, is above a second threshold value.

2. The method of temporal filtering according to claim 1, further comprising reactivating the temporal filters when said variation is below said second threshold value for at least during the processing of a following disparity map.

3. The method of temporal filtering according to claim 1, wherein said de-activating the temporal filters for at least said current disparity map is done when variations of the number of non-stationary pixels from said current disparity map and at least each of four previous disparity maps from said n different successive disparity maps, is above a third threshold value.

4. The method of temporal filtering according to claim 3, wherein said variations are measured in percentages, and said third threshold value is 15%.

5. The method of temporal filtering according to claim 3, wherein said variations are measured in percentages, and said third threshold value is 25%.

* * * * *